United States Patent Office 3,251,812
Patented May 17, 1966

3,251,812
TERMINALLY REACTIVE POLYMERS
Henry L. Hsieh, Bartlesville, Okla., assignor to Phillips Petroleum Company, a corporation of Delaware
No Drawing. Filed June 15, 1961, Ser. No. 117,299
16 Claims. (Cl. 260—79.5)

This invention relates to improved terminally reactive polymers and to their method of preparation. In another aspect, it relates to a method of curing a polymer which contains terminal aziridinyl groups and to the resulting product.

Uraneck, Hsieh and Buck have described in an article in The Journal of Polymer Science, vol. XLVI, 148, 1960, page 535, that polymers having reactive terminal groups can be prepared using an organo alkali metal as a polymerization initiator. The polymer which results from such a polymerization contains alkali metal end groups which can be replaced with more stable reactive end groups by reaction with a suitable reagent. These polymers can then be cured by reaction with polyfunctional organic compounds reactive with the end groups of the polymer. The reactive terminal substituents on the polymer molecules enable a more effective cure since all of the polymer molecule can be tied into the cross-linked structure. The term "telechelic" has been coined to define these terminally reactive polymers and as used in this specification, it refers to a polymer which contains a reactive group upon each end of the molecule. Expressed in another way, telechelic polymers contain at least two terminally reactive groups per molecule. The term "semi-telechelic" is used to refer to a polymer which has a functional group upon only one end of the polymer molecule. This nomenclature can be extended to define the type of telechelic polymer by using the name of the reactive end groups as a prefix, as, for example, carboxy telechelic polymer or carboxy telechelic polybutadiene which is a polybutadiene having a carboxy group upon each end of the polymer molecule.

I have now discovered a new composition which is a polymer of vinylidene-containing compound, said polymer having at least one terminally positioned aziridinyl group per molecule. The preferred compositions of my invention are aziridinyl telechelic polymers such as aziridinyl telechelic polybutadiene. These polymers can be prepared by polymerizing a polymerizable vinylidene-containing monomer in the presence of an organo alkali metal initiator and reacting the resulting polymer containing terminal alkali metal atoms with a polyaziridinyl compound. In another aspect, my invention resides in the cured polymer product which can be made by reacting a polymer of a vinylidene-containing compound having at least one terminally positioned aziridinyl group per molecule with a polyfunctional organic compound having active hydrogen atoms. In a preferred aspect of my invention, an aziridinyl telechelic conjugated diene polymer is cured with a mercapto-substituted carboxy acid. The aziridinyl telechelic polymer can be cured by heat alone or with the above-mentioned polyfunctional organic compounds either with or without auxiliary curatives such as organic peroxides, sulfur or sulfur compounds.

It is an object of my invention to provide a new terminally reactive polymer which contains aziridinyl groups. Another object is to provide a method of preparing an aziridinyl telechelic polymer. Still another object is to provide a method of curing a polymer which contains at least one terminally positioned aziridinyl group per molecule. Still another object of my invention is to provide a cured product which is derived by reacting an aziridinyl-telechelic polymer with a polyfunctional organic compound. Other objects, advantages and features of my invention will be apparent to those skilled in the art from the following discussion.

The polymers which contain terminally reactive alkali metal atoms can be prepared from a wide variety of monomers. The preferred monomers are the aliphatic conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of my invention and preferred monomers are butadiene, isoprene and piperylene.

In addition to the conjugated dienes I can practice my invention with other monomers containing a $CH_2=C<$ group such as the vinyl-substituted aromatic compounds. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include: 3-methylstyrene (3-vinyltoluene), 4-n-propylstyrene, 4-dodecylstyrene, 4-cyclohexylstyrene, 2-ethyl-4-benzylstyrene, 4-p-tolylstyrene, 4-(4-phenyl-n-butyl)styrene, 4-methoxystyrene, 3,5-diphenoxystyrene, 4-dimethylaminostyrene, 4-methoxy-6-di-n-propylaminostyrene, 4,5 - dimethyl - 1 - vinylnaphthalene, 8-phenyl - 1 - vinylnaphthalene, 4 - methoxy - 1 - vinylnaphthalene, 3,6-dimethylamino-1-vinylnaphthalene, and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers or copolymers with each other. These polar monomers can be employed to form block copolymers with conjugated dienes and/or vinyl-substituted aromatic compounds. When preparing these block copolymers the polar monomer is introduced after the non-polar monomers have polymerized. A detailed description of block copolymer containing terminal reactive groups and their method of preparation is set forth in the copending application of R. P. Zelinski, Serial No. 796,277, filed March 2, 1959, now abandoned. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy, and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include: 2-vinylpyridine, 3,5-diethyl-4-vinylpyridine, 3-n-dodecyl-2-vinylpyridine, 5-cyclohexyl - 2-vinylpyridine, 4-phenyl-2-vinylpyridine, 3-benzyl-4-vinylpyridine, 6-methoxy-2-vinylpyridine, 4-phenoxy-2-vinylpyridine, 4-dimethylamino-2-vinylpyridine, 2-vinylquinoline, 3-methyl-4-ethoxy-2-vinylquinoline, 3-vinylisoquinoline, 4-phenyl-1-vinylisoquinoline and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylontrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound. Ordinarily the initiator is prepared in a polar solvent such as an ether, for example, diethyl ether.

The organo alkali metal compound initiates the polymerization reaction, the organo radical ordinarily being incorporated in the polymer chain and the alkali metal being attached terminally at at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 1 to 4.

The organo alkali metal initiators employed for preparing the polymers used in my invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 1 to 4. The R in the formula generally contains from 1 to 20 carbon atoms although it is within the scope of the invention to use higher molecular weight compounds. By far the best results are obtained with organolithium compounds which give very high conversions to the terminally reactive polymer. Lithium is, therefore, the preferred alkali metal for the polymerization initiator. Examples of mono- and poly-alkali metal substituted hydrocarbons which can be employed for the polymerization initiator include methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,10-dilithiodecane, 1,20-dilithioeicosane, 1,4-dilithio-2-methyl-2-butene, 1,4-dipotassio-2-butene, dilithionaphthalene, 4,4'-dilithiobiphenyl, dilithioanthracene, 1,2-dilithio-1,1-diphenylethane, 1,2-dilithio-1,2 - diphenylethane, 1,4-dilithiocyclohexane, 1,3,5-trilithiocyclohexane, 1,4-dirubidiobutane, 1,8-dicesiooctane, 1,5-dilithio-3-pentyne, dilithiophenanthrene, 1,2-dilithiotriphenylethane, dilithiomethane, and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithium-stilbene adduct). An initiator which is preferred for the formation of semitelechelic polymers is n-butyllithium. Other preferred initiators for the formation of telechelic polymers are the dilithium adducts of 2,3-dialkyl-1,3-butadienes, 2,3-dimethyl-1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 40 millimoles per 100 grams of monomers. It is preferred that the polymerization be carried out in the presence of a suitable diluent which is predominantly hydrocarbon, such as benzene, toluene, cyclohexane, methylcyclohexane, xylene, n-butane, n-hexane, n-heptane, isooctane, and the like. Generally the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization. As stated previously, the organolithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

The aziridinyl-telechelic polymers are formed by reacting the polymer containing terminal alkali metal atoms with a polyaziridinyl compound. The polymer prepared with the organo alkali metal initiator is in solution in the with the polyaziridinyl terminating agent. In the reacpolymerization solvent and can be contacted in this state tion which ensues, one of the aziridinyl rings opens and combines with the alkali metal terminated polymer, for example as follows (φ stands for a phenyl radical):

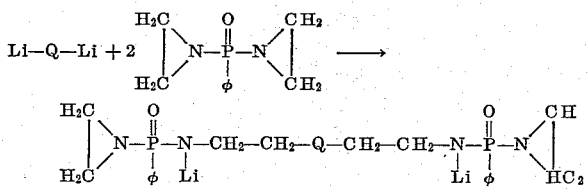

where Q represents a polymer chain. The lithium atoms are replaced with hydrogen atoms, for example, by hydrolysis, and a stable but terminally reactive aziridinyl-telechelic polymer is formed. Coupling reactions can also occur. In general, any organic compound which contains 2 or more aziridinyl groups per molecule can be employed provided it is soluble, miscible or readily dispersible in the polymer solution. Mixtures of such reagents can be used.

In the preferred polyaziridinyl terminating agents, each aziridinyl group can be represented by the formula

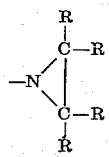

wherein each R can be hydrogen, alkyl, aryl, or cycloalkyl radicals or composites of these hydrocarbon radicals such as aralkyl, alkaryl, cycloalkylaryl, cycloalkylalkyl, arylcycloalkyl, alkylcycoalkyl and the like, and the total of said R groups contains up to 20 carbon atoms. Preferably each aziridinyl group as above-defined is attached to a carbon, phosphorus or sulfur atom in the compound and more than one aziridinyl group can be attached to the same carbon, phosphorus or sulfur. These carbon, prosphorus or sulfur atoms are in turn doubly bonded to another atom. The sulfur is attached to oxygen through a double bond and the carbon or phosphorus is doubly bonded to an oxygen, sulfur or nitrogen atom. These carbon, phosphorus or sulfur atoms are also attached to another aziridinyl group and/or other atoms in the compound which can with the carbon or phosphorus form a cyclic compound, as for example, in the triazines and triphosphatriazines. The make-up of the remainder of the terminating agent is not particularly important since it is the aziridinyl rings which function in the reaction, one ring to react with the alkali metal terminated polymer and another to remain as a terminal functional group in the polymer product. There should, however, be no other functional groups present more reactive than the aziridinyl group which would terminate the polymer by replacing the alkali metal atoms therein with hydrogen. This would preclude the desired reaction which attaches the aziridinyl compound to ends of the polymer molecule. For the same reason, caution should be exercised to avoid contacting the alkali metal telechelic polymer with other materials such as water, acids or alcohols which would terminate the polymer with an inactive substituent.

Illustrative of the types of aziridinyl compounds which can be used are the di- and tri(aziridinyl) phosphine oxides or sulfides, di- and tri-aziridinyl substituted triazines, di-, tri-, tetra-, penta- and hexaaziridinyl substituted triphosphatriazines, compounds containing aziridinyl substituted carbonyl, sulfoxyl or sulfonyl groups such as diamides and disulfonamides in which the nitrogen is a member of the aziridinyl ring, and the like. The following is a list of specific compounds, which while not exhaustive, illustrates the types of compounds which are suitable:

Tri(1-aziridinyl)phosphine oxide,
Tri(2-methyl-1-aziridinyl)phosphine oxide,
Tri(2-methyl-3-ethyl-1-aziridinyl)phosphine oxide,
Tri(2-ethyl-3-decyl-1-aziridinyl)phosphine oxide,
Tri(2-eicosyl-1-aziridinyl)phosphine oxide,
Tri(2-methyl-3-cycylopentyl-1-aziridinyl)phosphine oxide,
Tri(2-phenyl-1-aziridinyl)phosphine oxide,
Tri[2-ethyl-3-(1-naphthyl)-1-aziridinyl]phosphine oxide,
Tri(2-nonyl-3-benzyl-1-aziridinyl)phosphine oxide,
Tri[2-n-propyl-3-(2-phenylethyl)-1-aziridinyl]phosphine axide,
Tri[2-heptyl-3-(2,4-dimethylphenyl)-1-aziridinyl]phosphine oxide,
Tri(2-methyl-1-aziridinyl)phosphine sulfide,
Tri(2-methyl-3-cyclohexyl-1-aziridinyl)phosphine sulfide,
Tri(2-phenyl-1-aziridinyl)phosphine sulfide,
Tri(2-amyl-3-benzyl-1-aziridinyl)phosphine sulfide,
Phenyl-bis(2-methyl-1-aziridinyl)phosphine sulfide,
Phenyl-bis(2-methyl-1-aziridinyl)phosphine oxide,
Phenyl-bis(2-methyl-3-ethyl-1-aziridinyl)phosphine oxide,
Bis(2methyl-1-aziridinyl)sulfoxide,
Bis(2-propyl-1-aziridinyl)sulfoxide,
Bis(1-aziridinyl)sulfone,
Bis(2-propyl-1-aziridinyl)sulfone,
Bis(1,2-propylene)-1,3-urea,
Bis(4,5-octylene)-1,3-urea,
Tri(2,2-dimethyl-1-aziridinyl)phosphine oxide,
Tri(2,2,4,4-tetraethyl-1-aziridinyl)phosphine oxide,
Tri(2,2-dimethyl-3-ethyl-1-aziridinyl)phosphine oxide,
N,N-dioctylamino-bis(2,2-dimethyl-1-aziridinyl)phosphine oxide,
N,N-diphenylamino-bis(2,2-di-n-propyl-1-aziridinyl)phosphine sulfide,
Tri(2,2-dimethyl-1-aziridinyl)phosphine sulfide,
n-butoxy-bis(1-aziridinyl)phosphine oxide,
N-pentamethylene-bis(2-methyl-2-phenyl-1-aziridinyl) phosphine sulfide,
2,4,6-tri(1-aziridinyl)-1,3,5-triazine,
2,4,6-tri(2-methyl-1-aziridinyl)-1,3,5-triazine,
2,4,6-tri(2-methyl-3-ethyl-1-aziridinyl)-1,3,5-triazine,
2,4,6-tri(2-ethyl-3-octadecyl-1-aziridinyl)-1,3,5-triazine,
2,4,6-tri(2-methyl-3-cyclopentyl-1-aziridinyl)-1,3,5-triazine,
2,4,6-tri(2-phenyl-1-aziridinyl)-1,3,5-triazine,
2,4,6-tri(2,3-diphenyl-1-aziridinyl)-1,3,5-triazine,
2,4,6-tri(2-n-propyl-3-(2-phenylethyl)-1-aziridinyl)-1,3,5-triazine,
2,4,6-tri(2-methyl-3-(4-methylphenyl)-1-aziridinyl)-1,3,5-triazine,
2-cyclohexyl-4,6-bis(2,2-dimethyl-1-aziridinyl)-1,3,5-triazine,
2,4,6-tri(1-aziridinyl)-2,4,6-triphospha-1,3,5-triazine,
2,4,6-tri(2-methyl-3-n-butyl-1-aziridinyl)-2,4,6-triphospha-1,3,5-triazine,
2,4,6-tri(2-ethyl-3-cyclohexyl-1-aziridinyl)-2,4,6-tri-phospha-1,3,5-triazine, 2,4,6-tri[2-n-propyl-3-(2-phenylethyl)-1-aziridinyl]-2,4,6-triphospha-1,3,5-triazine,
2,4,6-tri[2-heptyl-3-(2,4-dimethylphenyl)-1-aziridinyl]-2,4,6-triphospha-1,3,5-triazine,
2,2,2,4,4,6,6-hexa(2-methyl-1-aziridinyl)-2,4,6-triphospha-1,3,5-triazine,
hereinafter referred to as hexa-2-methyl-1-aziridinyl-triphosphatriazine,
2,2,4,6-tetra(2-hexyl-1-aziridinyl(-2,4,6-triphospha-1,3,5-triazine,
2-benzyl-4,6-bis(2,2,3-triethyl-1-aziridinyl)-2,4,6-triphospha-1,3,5-triazine,
Bis(1,2-propylene)-carboxamide,
Ethylene glycol bis(2,3-butylene)carboxamide,
Diethylene glycol bis(1,2-ethylene)-carboxamide,
Bis(1,2-propylene)adipamide,
Bis(2,2-dimethylethylene)adipamide,
Bis(1,2-propylene)benzene-m-disulfonamide,
Bis(2,2,3-tri-n-propylethylene)benzene-m-disulfonamide,
Bis(1,2-propylene)terephthalamide,
and the like.

The most convenient method of placing the aziridinyl group on the end of the polymer molecule is by reacting the polyaziridinyl compound with the polymer containing the terminal alkali metal atoms in solution, preferably in the polymerization medium. The multifunctional terminating agent can be added to the unquenched polymer solution which is formed in the polymerization process. The temperature of this treatment can vary considerably, for example, from about −50° C. to 100° C., but preferably is in the range from about 0 to 75° C. The reaction time is governed in part by the temperature used since higher temperatures require shorter reaction periods. The reaction time can be as short as one minute or as long as 80 hours or more, although there is seldom need to extend the reaction period beyond 20 to 25 hours.

The amount of aziridinyl terminating agent used is normally in the range from about 1 to 40 gram moles per gram atom of alkali metal which is present in the polymer. If the amount of terminating agent employed is in the lower part of this range coupling reactions tend to occur, whereas with larger amounts of the terminating agent less coupling results. Such coupling reactions produce not only extended polymer chains which contained terminal aziridinyl groups but the polymer also contains secondary amino groups spaced at intervals along the polymer chain at points where coupling has occurred. Whether or not coupling occurs, replacement of the alkali metal with hydrogen which can be effected by treatment with an alcohol or other suitable reagent provides a secondary amino group with the nitrogen which formed a part of the aziridinyl ring that opened in reaction with the alkali metal, as has been previously illustrated.

In recovering the aziridinyl terminated polymer, the alkali metal atoms therein are replaced with hydrogen atoms by hydrolysis or by using an alcohol or by acidifying the polymer solution. A mixture of hydrochloric acid in isopropyl alcohol can be used and the polymer is then washed with water until neutral.

It should be understood that although a total polymeric composition prepared as above-described for telechelic polymers should have at least 2 terminal reactive groups per molecule, the actual average number of reactive groups may be somewhat less than theoretical. For example, a polymer prepared with a dilithium initiator has a theoretical maximum of 2 reactive groups per molecule, one at each end. Minute amounts of moisture in the terminating agent will reduce the number of polyfunctional molecules so that the recovered polymer can contain small amounts of mono- and nonfunctional polymer. The same is true in the preparation of semi-telechelic polymers where some nonfunctional molecules present may reduce the actual average number of reactive groups per molecule to somewhat less than 1. The functionality must be interpreted as an approximate figure, therefore, so that polymeric compositions which contain about 1 terminal reactive group per molecule can be characterized as semi-telechelic while polymeric compositions containing about 2 or more such terminal groups can be characterized as telechelic polymers.

The products of this invention are self-curing when heated since the aziridinyl terminal groups can undergo reaction with each other. Polymers can also be coupled and/or cured with certain types of polyfunctional curatives which react with the aziridinyl or with the secondary amino groups present in the polymer molecule. The term "polyfunctional curative" is intended to include organic compounds which contain two or more functional groups. Curatives which can be employed include polybasic acids such as succinic acid, phthalic acid, pyromellitic acid, glutaric acid, adipic acid, pimelic acid, suberic acid, azelaic acid, isophthalic acid, terephthalic acid, hemimellitic acid, trimellitic acid, trimesic acid, prehnitic acid, mellitic acid, diphenic acid, o-phenylene diacetic acid, and anhydrides such as pyromellitic dianhydride, diphenic anhydride, succinic anhydride, and the like. Carboxy containing polymers form a preferred group of curatives and included in this class are such materials as carboxy telechelic polybutadiene, butadiene-acrylic acid copolymers and polymerized fatty acids.

In addition to the foregoing curatives, polyepoxides which will react with the secondary amino groups can also be used. Examples of suitable polyepoxides include 1,2,3,4-diepoxybutane, 1,2,5,6-diepoxyhexane, limonene dioxide, bis-epoxycyclopentyl ether of ethylene glycol, (2 - methyl - 4,5 - epoxycyclohexyl)methyl-2-methyl-4,5-epoxycyclohexyl carboxylate, 1,2,5,6,9,10-triepoxydecane, 1,2,11,12 - diepoxydodecane, 1,2,11,12 - diepoxy - 5,8 - dioxadodecane, 1,2,9,10-diepoxy-4,7-dithiadecane, 1,2,16,17-diepoxy - 6,9,12 - trithiaheptadecane, 1,2,12,13 - diepoxy-4,7,10-trioxahexadecane, and the like.

The foregoing curatives can be used alone or in conjunction with conventional curatives such as organic peroxides, sulfur or sulfur compounds. Generally, organic peroxides containing up to 30 carbon atoms per molecule are suitable, for example, dimethyl peroxide, di-tert-butyl-peroxide, dicumyl peroxide, benzoyl peroxide, benzyl-α-methylbenzyl peroxide, and the like. Sulfur type vulcanizing agents in addition to sulfur include thiurampolysulfides such as tetramethylthiuram disulfide, tetraethylthiuram trisulfide, tetrraamylthiuram disulfide, tetracyclohexylthiuram disulfide, and dipentamethylenethiuram tetrasulfide; selenium dithiocarbamates such as selenium dimethyldithiocarbamate, selenium diethyl dithiocarbamate, selenium dicyclohexyl dithiocarbamate, and selenium pentamethylene dithiocarbamate; and N,N'-polythiodiamines such as N,N' - dithiobis(diethylamine), N,N' - dithiobis(dibutylamine), N,N'-dithiobis(morpholine), N,N'-dithiobis(n-butylaminoacetonitrile), N,N'-dithiobis(beta-ethylaminopropionitrile), and N,N' - dithiobis(n - butylaminopropionitrile).

In addition to serving as coupling and/or curing agents, some of the foregoing materials can also be used as plasticizers. Of particular interest in this regard are the liquid polymers which contain carboxy groups, for example, liquid carboxy telechelic polybutadiene, liquid butadiene-acrylic acid copolymers, and the like. These polymers become a part of the polymer network when cured and are, therefore, not extractable. In this manner, they serve both as plasticizers prior to curing and also as coupling or cross-linking agents when the product is cured.

I have found that improved cured products of this type can be formed if the curing agent is a mercapto-substituted carboxy acid. These coupling agents can be used without auxiliary curatives but are particularly effective when employed in conjunction with sulfur curatives or with organic peroxides. There is evidence that the mercapto-substituted carboxy acid is capable of functioning in two ways; first by reacting with the terminal aziridinyl groups and also reacting through the mercapto substituents with the double bonds in the polymer chain. These mercapto-substituted carboxy acids which are employed as coupling and/or cross linking agents for the aziridinyl polymers contain at least one mercapto and one carboxy group per molecule. Corresponding anhydrides can also be used. As is commonly understood, by "mercapto-substituted" I do not include SH groups present in thiol acid groups. Examples of these compounds include thioglycollic acid (mercaptoacetic acid), 2-mercaptopropanoic acid, 4-mercaptobutanoic acid, 3-mercaptobutanoic acid, 5-mercaptopentanoic acid, 2-mercapto-1,4-butanedioic acid (mercaptosuccinic acid), 3-mercaptopentanedioic acid, 2,5-dimercaptohexanedioic acid, 2-mercaptoacrylic acid (2-mercaptopropenoic acid), 2-mercaptocrotonic acid (2-mercapto-2-butenoic acid), 4-mercapto-3-butenoic acid, 2-mercaptobenzoic acid, 2-mercapto-1-naphthoic acid, 2-mercaptocyclohexane carboxylic acid, thioglycollic anhydride (2-mercaptoacetic anhydride), 2-mercaptopropanoic anhydride, 3-mercaptobutanoic anhydride, 3-mercaptophthalic anhydride, 4,5-dimercaptophthalic anhydride, 3,5-dimercaptophthalic anhydride, 3-mercapto-$\Delta^4$-tetrahydrophthalic anhydride, 4,5-dimercaptophthalic anhydride, and the like.

The amount of curative or coupling agent to be employed can vary considerably although generally about one equivalent of the cross linking or coupling agent is used per gram atom of alkali metal charged in the polymerization reaction. While there can be two or more aziridinyl groups per terminal group in the polymer and each aziridinyl group is capable of reacting, only one of these need be involved in the cross linking reaction with the coupling agent in order to produce an effective cure. The amount of curative can be varied, therefore, to determine the state of cure desired. The hardness as well as other properties of the product are determined by the amount of curative employed. If a substantial excess of curative is used, it is possible to react all the aziridinyl groups in the polymer chain. Ordinarily, treating the reactive end of the polymer molecule as a single functional group, the amount of curative employed varies from about 70 to 80 percent of the stoichiometric amount to as high as 150 percent of stoichiometric. Of course, as has been pointed out, substantially more curative can be used where it is desired to more completely react the aziridinyl groups present in the polymer molecule. The same rule can be used to govern the amount of diepoxide used which it to be reacted with the secondary amines present in the polymer molecule. Ordinarily the amount of auxiliary curatives such as the organic peroxide, sulfur or sulfur compounds is used in the amount of about 0.05 to 5 parts by weight per 100 parts of polymer.

In connection with the amount of coupling agent required, it should be understood that the products are also heat curable and the polymer can be reacted with itself to produce a cured polymeric product. The curing temperatures which are use can vary considerably and if the time is long enough, some curing can be effected at room temperature. Ordinarily the temperature is above 100° F., however, and seldom does the temperature exceed 400° F. Preferred temperatures for operation are in the range of about 150 to 320° F. and a temperature of at least 150° F. is ordinarily required for heat curing. The time involved depends upon the temperature and at the lower temperatures, extended curing periods are required, extending for as long as 8 or 10 days or more. At the higher temperatures the curing period is considerably shorter to achieve the desired result and in general a period from about 1 minute to 10 hours or longer gives a satisfactory product. Usually, at least 5 minutes is needed for appreciable results on heat curing in the absence of the polyfunctional coupling agent.

The aziridinyl telechelic polymers can range from viscous liquids to rubbers and resinous materials which can be coupled and/or cross-linked to provide a variety of products. Liquid polymers can be increased in viscosity and converted to solids while soft gums can be cured to considerably more rigid materials. The rubbery aziridinyl telechelic polymers can be compounded and cured to give finished products which have an excellent balance of properties. These polymers are useful in adhesives, potting compositions, for tread stocks and in the fabrication of many types of molded objects.

In order to illustrate further the advantages of my invention, the following examples are presented. The conditions and proportions presented in these examples are typical only and should not be construed to limit my invention unduly.

*Example I*

The following recipe was employed for the polymerization of butadiene:

| | |
|---|---|
| 1,2-butadiene, parts by weight | 100 |
| Cyclohexane, parts by weight | 780 |
| 1,2-dilithio-1,2-diphenylethane, millimoles | 30 |
| Temperature, ° F. | 122 |
| Time, hour | 1 |

The 1,2-dilithio-1,2-diphenylethane was prepared by reaction of lithium with stilbene (1,2-diphenylethylene). The recipe was as follows:

| | Parts by weight |
|---|---|
| Trans-stilbene (0.15 mole) | 27 |
| Lithium (0.50 mole) | 3.5 |
| Diethyl ether (450 ml.) | 321 |
| Tetrahydrofuran (50 ml.) | 44 |
| Temperature, ° F. | 122 |
| Time, hours | 2 |
| Total alkalinity, N | 0.6 |

When carrying out the polymerization, cyclohexane was charged first after which the reactor was purged with nitrogen. Butadiene was added and then the 1,2-dilithio-1,2-diphenylethane. The temperature was regulated at 122° F. and after one hour the conversion was quantitative.

At the end of the polymerization the lithium telechelic polymer was converted to an aziridinyl telechelic polymer by treatment with phenyl-di(2-methyl-1-aziridinyl)phosphine oxide (phenyl MAPO) or tri-(2-methyl-1-aziridinyl)phosphine oxide (MAPO). The amount of terminating agent used was 150 millimoles, based on 30 millimoles of initiator charged to the polymerization. An instantaneous reaction occurred and a firm, gel-like product formed which fluidized rapidly at 122° F. The polymer solution was washed with water and the polymer was coagulated in isopropyl alcohol and dried in a vacuum oven after which 0.5 weight percent of 2,2'-methylene-bis(4-methyl-6-tert-butylphenol) was added as an antioxidant. Runs with the two terminating agents are summarized in the following table:

| Run No. | Terminating agent | Inherent viscosity | Gel, percent |
|---|---|---|---|
| 1 | Phenyl MAPO | 0.32 | 0 |
| 2 | MAPO | 0.31 | 0 |

Samples of each of the liquid aziridinyl telechelic polymers were blended in variable amounts with different cross-linking agents. The compositions were placed in a forced air oven at 160° F. for 3 days after which inherent viscosity and gel were determined. An increase in inherent viscosity and/or gel was indicative of coupling and/or cross-linking. Results are shown in the following table:

| Run No. | Aziridinyl telechelic polymer (A) | Cross-linking agent (B) | A/B [1] | Inherent viscosity [2] | Gel, percent |
|---|---|---|---|---|---|
| 1 | 1 | Butadiene/acrylic acid copolymer [3] | 0.8/1 | 0.38 | 8.6 |
| 2 | 1 | do | 1.4/1 | 0.33 | 24.2 |
| 3 | 1 | do | 1.8/1 | 0.30 | 34.3 |
| 4 | 1 | do | 2.4/1 | 0.29 | 39.5 |
| 5 | 2 | do | 0.8/1 | 0.24 | 29.8 |
| 6 | 2 | do | 1.4/1 | | 62.3 |
| 7 | 2 | do | 1.8/1 | | 67.5 |
| 8 | 2 | do | 2.4/1 | | 66.7 |
| 9 | 1 | Carboxy telechelic polybutadiene [4] | 0.8/1 | 0.51 | 0 |
| 10 | 1 | do | 1.4/1 | 0.69 | 2 |
| 11 | 1 | do | 1.8/1 | 0.45 | 9.1 |
| 12 | 1 | do | 2.4/1 | 0.52 | 22.5 |
| 13 | 2 | do | 0.8/1 | 0.39 | 2.5 |
| 14 | 2 | do | 1.4/1 | 0.37 | 48.0 |
| 15 | 2 | do | 1.8/1 | | 69.9 |
| 16 | 2 | do | 2.4/1 | 0.57 | 40.5 |
| 17 | 1 | Polymerized fatty acid [5] | 0.8/1 | 0.27 | Trace |
| 18 | 1 | do | 1.4/1 | 0.45 | 7.7 |
| 19 | 1 | do | 1.8/1 | 0.48 | 4.6 |
| 20 | 1 | do | 2.4/1 | 0.38 | 31.4 |
| 21 | 2 | do | 0.8/1 | 0.38 | 37.5 |
| 22 | 2 | do | 1.4/1 | | 70.1 |
| 23 | 2 | do | 1.8/1 | | 76.8 |
| 24 | 2 | do | 2.4/1 | | 70.8 |
| 25 | 2 | Pyromellitic dianhydride | Excess [6] | | 68 |

[1] Equivalent ratio based on initiator charged (one mole of cross-linking agent is considered equivalent to one gram atom of lithium).
[2] Determined on soluble portion.
[3] Butadiene-acrylic acid copolymer containing 0.063 equivalent of COOH per 100 grams polymer. It is designated as PBAA-143 and is a product of American Synthetic Company.
[4] Butarez CTL: Polybutadiene having a carboxy content of 0.74 weight percent and a Brookfield viscosity at 77° F. of 1030 poises. This product was obtained by polymerizing 1,3-butadiene in toluene solvent in the presence of 22 millimoles per 100 parts of butadiene of an initiator which was a dilithium adduct of 2,3-dimethyl-1,3-butadiene. The polymerization temperature was 122° F. and conversion was 100 percent in 1.3 hours. This polymer was carbonated with a substantial excess of carbon dioxide by contacting the polymer solution in a Pownell mixing tee. The carbonated solution was treated with anhydrous HCl and filtered through diatomaceous earth, after which 0.5 parts by weight per 100 parts polymer of 2,2'-methylene-bis(4-methyl-6-tert-butylphenol) was added as an antioxidant.
[5] Emery Acid 3079S, a product of Emery Industries, Inc., containing 0.34 equivalent of COOH per 100 grams of material.
[6] Exact quantity not measured.

The data show that the aziridinyl telechelic polymers would be cross-linked with polyacids, a polyanhydride, or a polymer containing carboxy groups.

*Example II*

A rubbery butadiene/styrene random copolymer was prepared using 1,2-dilithio-1,2-diphenylethane as the initiator (see Example I). The recipe was as follows:

| | Parts by weight |
|---|---|
| 1,3-butadiene | 70 |
| Styrene | 30 |
| Cyclohexane | 780 |
| 1,2-dilithio-1,2-diphenylethane | 1 |
| Tetrahydrofuran (1.5 mmole) | 0.29 |
| Temperature, °F. | 122 |
| Time, hour | 1 |

Cyclohexane was charged first, the reactor was purged with nitrogen, and styrene, butadiene, tetrahydrofuran, and the initiator were added in the order named. At the end of the polymerization, 20 millimoles of tri(2-methyl-1-aziridinyl)phosphine oxide was added as in Example I. The polymer was coagulated with isopropyl alcohol, separated, and antioxidant added as in the preceding example. It was then dried in a vacuum oven. It had a Mooney value (ML-4 at 212° F.) of 25.

The rubbery telechelic polymer was compounded in a tread stock recipe, with and without thiomalic acid, and physical properties determined. A control run was made without thiomalic acid using a 75/25 butadiene/styrene copolymer prepared by emulsion polymerization at 41° F. (Philprene * 1500, ML-4 at 212° F. of 54). The compounding recipes and physical properties of the cured stocks are shown in the following table:

COMPOUNDING RECIPES, PARTS BY WEIGHT

| | A | B | C |
|---|---|---|---|
| Aziridinyl telechelic polymer | 100 | 100 | |
| Philprene* 1500 | | | 100 |
| Philblack* O [1] | 50 | 50 | 50 |
| Zinc oxide | 3 | 3 | 3 |
| Stearic acid | 1 | 1 | 1 |
| Flexamine [2] | 1 | 1 | 1 |
| Philrich* 5 [3] | 10 | 10 | 10 |
| Sulfur | 1.75 | 1.75 | 1.75 |
| Santocure [4] | 1.0 | 1.0 | 1.2 |
| Thiomalic acid (2-mercapto-1,4-butanedioic acid) | | 2.5 | |

PROCESSING DATA

| | A | B | C |
|---|---|---|---|
| Raw ML-4 at 212° F | 25 | | 54 |
| Compounded MS-1½ at 212° F | 38 | | 32.5 |
| Extrusion at 250° F | | | |
| Inches/minute | 84 | | 44.5 |
| Grams/minute | 120.5 | | 115.5 |
| Rating | 12— | | 12— |

PHYSICAL PROPERTIES, CURED 30 MINUTES AT 307° F.

| | A | B | C |
|---|---|---|---|
| $V_r$ | 0.384 | 0.414 | 0.392 |
| 300% modulus, p.s.i | 1,560 | 1,590 | 1,430 |
| Tensile, p.s.i | 3,520 | 4,420 | 3,620 |
| Elongation, percent | 550 | 615 | 560 |
| $\Delta$ T, ° F. (45 minute cure) | 54.7 | 43.3 | 63.2 |
| Resilience, percent | 73.1 | 74.8 | 59.5 |
| Shore A hardness | 62.5 | 65.0 | 60 |

OVEN AGED 24 HOURS AT 212° F.

| | A | B | C |
|---|---|---|---|
| 300% modulus, p.s.i | 2,070 | 2,380 | 2,300 |
| Tensile, p.s.i | 3,820 | 4,010 | 3,370 |
| Elongation, percent | 480 | 480 | 410 |
| $\Delta$ T, ° F. | 46.9 | 40.9 | 53.7 |
| Resilience, percent | 76.9 | 76.7 | 67.3 |

*Trademark.
[1] High abrasion furnace black.
[2] A physical mixture containing 65 percent of a complex diarylamine-ketone reaction product and 35 percent of N,N'-diphenyl-p-phenylenediamine.
[3] Highly aromatic oil.
[4] N-cyclohexyl-2-benzothiazolesulfenamide.

These data show that the aziridinyl telechelic polymer gave an excellent balance of physical properties with and without the use of a coupling agent. The results indicate that the aziridinyl telechelic polymer underwent heat curing in addition to the normal crosslinking brought about by conventional curatives. The aziridinyl telechelic polymer had lower heat build-up and higher resilience than the emulsion copolymer in both unaged and aged stocks and was also superior in aged tensile strength to the emulsion polymer.

The use of thiomalic acid resulted in a significant improvement in tensile strength, heat build-up, and resilience when employed in the telechelic rubber, and gave a vulcanized product which was superior to the higher Mooney non-telechelic rubber.

Example III

Two runs were made for the copolymerization of butadiene with styrene using the recipe of Example II except for the initiator level. In one run it was 1.4 millimoles and in the other it was 2 millimoles. Rubbery products from both runs were blended to give an aziridinyl telechelic polymer with a Mooney value (ML-4 at 212° F.) of 15. This rubber and the 54-Mooney rubber used in Example II (Philprene 1500) were compounded and cured, and physical properties determined. These runs are summarized in the following table:

COMPOUNDING RECIPES; PARTS BY WEIGHT

|  | A | B | C | D |
|---|---|---|---|---|
| Aziridinyl telechelic polymer | 100 | 100 |  |  |
| Philprene 1500 |  |  | 100 | 100 |
| Philblack O | 50 | 50 | 50 | 50 |
| Zinc oxide | 3 | 3 | 3 | 3 |
| Stearic acid | 1 | 1 | 1 | 1 |
| Flexamine | 1 | 1 | 1 | 1 |
| Philrich 5 | 10 | 10 | 10 | 10 |
| Sulfur | 1.75 | 1.75 | 1.75 | 1.75 |
| Santocure | 1.0 | 1.0 | 1.2 | 1.2 |
| Thiomalic acid |  | 2.5 |  | 2.5 |

PHYSICAL PROPERTIES, CURED 30 MINUTES AT 307° F.

|  | A | B | C | D |
|---|---|---|---|---|
| $V_r$ | 0.395 | 0.430 | 0.403 | 0.290 |
| 300% modulus, p.s.i | 1,420 | 1,830 | 1,170 | 380 |
| Tensile, p.s.i | 2,530 | 3,300 | 3,625 | 980 |
| Elongation, percent | 460 | 500 | 600 | 515 |
| $\Delta T$, ° F | 76.0 | 51.0 | 63.8 | 178.7 |
| Resilience, percent | 71.7 | 77.2 | 61.8 | 52.9 |
| Shore A hardness | 61.0 | 62.0 | 58.0 | 55.0 |

OVEN AGED 24 HOURS AT 212° F.

|  | A | B | C | D |
|---|---|---|---|---|
| 300% modulus, p.s.i | 2,310 | 2,470 | 2,300 | 1,280 |
| Tensile, p.s.i | 3,510 | 3,020 | 3,280 | 2,530 |
| Elongation, percent | 410 | 350 | 415 | 500 |
| $\Delta T$, ° F | 42.6 | 37.8 | 51.7 | 85.0 |
| Resilience, percent | 75.0 | 78.0 | 65.8 | 57.9 |

These data showed that the telechelic polymer had unusually good physical properties for such a low Mooney material and was superior to the emulsion polymer in aged tensile strength, heat build-up and resilience. The good properties of the telechelic polymer indicate that it underwent heat curing in addition to the curing effected by the conventional curatives.

These data show again that the addition of thiomalic acid to the aziridinyl telechelic polymer resulted in a significant increase in tensile strength and resilience and a pronounced decrease in heat build-up. The properties of aziridinyl polymer vulcanizate containing thiomalic acid compare favorably or are superior to the emulsion copolymer vulcanizate without thiomalic acid even though the latter rubber has a much higher Mooney. Thiomalic acid had a deleterious effect in the emulsion copolymer. The data show that the cure was greatly retarded.

Example IV

The 15-Mooney aziridinyl telechelic copolymer and the emulsion copolymer used in Example III were cured in a dicumyl peroxide recipe with and without thiomalic acid. The compounding formulations and results of physical property determinations are shown in the following table:

|  | A | B | C | D | E | F |
|---|---|---|---|---|---|---|
| Aziridinyl telechelic polymer | 100 | 100 | 100 |  |  |  |
| Philprene 1500 |  |  |  | 100 | 100 | 100 |
| Philblack O | 50 | 50 | 50 | 50 | 50 | 50 |
| Dip-Cup 40 C.[1] | 0.5 | 0.5 | 0.5 | 0.5 | 0.5 | 0.5 |
| Thiolmalic acid |  | 1.0 | 2.5 |  | 1.0 | 2.5 |

PHYSICAL PROPERTIES, CURED 30 MINUTES AT 307° F.

|  | A | B | C | D | E | F |
|---|---|---|---|---|---|---|
| 300% Modulus, p.s.i | 1,600 |  | 1,900 | 120 | 120 |  |
| Tensile, p.s.i | 1,600 | 2,100 | 2,800 | 180 | 120 | 80 |
| Elongation, percent | 300 | 245 | 430 | 900 | 450 | 250 |

[1] A product containing 40 percent active dicumyl peroxide and 60 percent precipitated calcium carbonate.

These data show that when using a peroxide curvative all the telechelic copolymer compositions were far superior in physical properties to the emulsion copolymer and that the best properties were obtained when thiomalic acid was employed.

Example V

Liquid carboxy telechelic polybutadiene was employed in variable quantities as a plasticizer for the 15-Mooney aziridinyl telechelic polymer described in Example III. A control was run without plasticizer. The compounding recipes, processing data, and physical properties are shown in the following table:

COMPOUNDING RECIPES, PARTS BY WEIGHT

|  | A | B | C | D |
|---|---|---|---|---|
| Aziridinyl telechelic copolymer | 100 | 95 | 90 | 80 |
| Liquid carboxy telechelic polybutadiene [1] |  | 5 | 10 | 20 |
| Philblack O | 50 | 50 | 50 | 50 |
| Di-Cup 40 C | 1.0 | 1.0 | 1.0 | 1.0 |

PROCESSING DATA

|  | A | B | C | D |
|---|---|---|---|---|
| Compounded MS-1½ at 212° F | 56 | 50 | 44 | 36 |

PHYSICAL PROPERTIES (CURED AT 307° F).

|  | A | B | C | D |
|---|---|---|---|---|
| 200% Modulus, p.s.i.: |  |  |  |  |
| 30 minutes cure | 1,780 | 1,520 | 1,920 | 1,600 |
| 45 minutes cure |  |  | 2,560 | 2,080 |
| Tensile, p.s.i.: |  |  |  |  |
| 30 minutes cure | 1,780 | 2,360 | 2,500 | 2,520 |
| 45 minutes cure | 1,980 | 2,260 | 2,720 | 2,420 |
| Elongation, percent: |  |  |  |  |
| 30 minutes cure | 200 | 240 | 240 | 280 |
| 45 minutes cure | 170 | 190 | 210 | 220 |
| $\Delta T$, ° F.: |  |  |  |  |
| 30 minutes cure | 78.4 | 73.6 | 74.7 | 69.9 |
| 45 minutes cure | 57.1 | 57.5 | 58.5 | 60.8 |
| Resilience, percent: |  |  |  |  |
| 30 minutes cure | 72.4 | 73.2 | 71.8 | 68.6 |
| 45 minutes cure | 76.0 | 75.2 | 75.0 | 71.8 |
| Shore A hardness: |  |  |  |  |
| 30 minutes cure | 69.5 | 69.5 | 68.0 | 66.0 |
| 45 minutes cure | 71.5 | 71.5 | 70.5 | 68.0 |
| Swell, percent, 30 minutes cure [2] | 35.8 | 35.7 | 32.7 | 36.0 |
| Extraction, percent, 30 minutes cure [2] | 7.8 | 8.6 | 8.7 | 10.7 |

[1] This product which had a carboxy content of 0.93 weight percent and a Brookfield viscosity at 77° F. of 1,308 poises was prepared substantially as described in connection with the carboxy telechelic polybutadiene used in Example I.
[2] Three days in ethanol-toluene azeotrope at 80° F.

These data show that the plasticizer lowered the compound Mooney and resulted in an improvement in tensile strength. Extraction values show that the liquid carboxy telechelic polymer was incorporated in the polymer network.

*Example VI*

Butadiene was copolymerized with styrene using the following recipe:

| | |
|---|---|
| 1,3-butadiene, parts by weight | 70 |
| Styrene, parts by weight | 30 |
| Cyclohexane, parts by weight | 780 |
| 1,2-dilithio-1,2-diphenylethane, mmoles | 1.5 |
| Tetrahydrofuran, parts by weight | 1.5 |
| Temperature, °F. | 122 |
| Time, hours | 1.5 |
| Conversion, percent | 100 |

Two runs were made. At the end of each polymerization, 6 millimoles of tri(2-methyl-1-aziridinyl)phosphine sulfide (MAPS) was added to one run and the same quantity of tri(2,2 - dimethyl - 1 - aziridinyl)phosphine oxide (DMAPO) was added to the other run. After coagulation and separation of each product, 0.5 part by weight per 100 parts rubber of the antioxidant, 2,2′-methylene-bis(4-methyl-6-tert-butylphenol), was added. The polymers were compounded, cured, and physical properties determined. Following is a summary of the runs:

| | Terminating agent | |
|---|---|---|
| | MAPS | DMAPO |
| Compounding Recipes, Parts by Weight: | | |
| Polymer | ¹100 | ²100 |
| High abrasion furnace black | 50 | 50 |
| Zinc oxide | 3.0 | 3.0 |
| Stearic acid | 2.0 | 2.0 |
| Flexamine | 1.0 | 1.0 |
| Philrich 5 | 10 | 10 |
| Sulfur | 1.75 | 1.75 |
| Santocure | 1.0 | 1.0 |
| Cured 30 Minutes at 307° F.: | | |
| V$_r$, in n-heptane | 0.409 | 0.402 |
| 300% Modulus, p.s.i | 1,140 | 1,160 |
| Tensile, p.s.i | 2,020 | 2,320 |
| Elongation, percent | 450 | 575 |
| ΔT, °F | 75 | 80.1 |
| Resilience, percent | 59.0 | 62.5 |
| Shore A hardness | 65 | 63.5 |

¹ ML-4 at 212° F., 20.
² ML-4 at 212° F., 14.

These data show that vulcanized rubbers of reasonably good properties were obtained from low Mooney polymers.

As will be apparent to those skilled in the art, various modifications can be made in my invention without departing from the spirit or scope thereof.

I claim:

1. A polymer having the formula selected from the group consisting of:

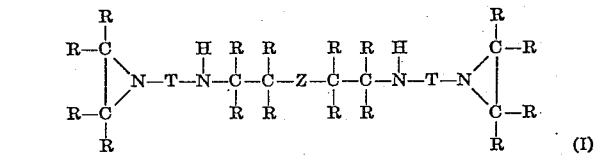

(I)

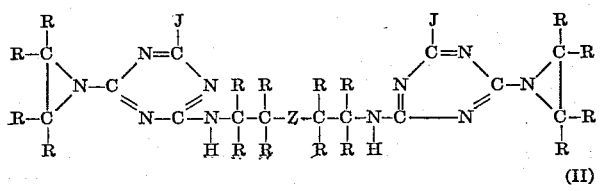

(II)

wherein T is selected from the group consisting of:

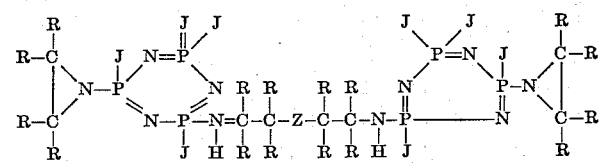

V is selected from the group consisting of phenyl,

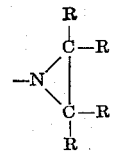

and

J is selected from the group consisting of

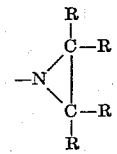

hydrogen, alkyl, cycloalkyl, and aryl radicals and composites thereof containing up to 12 carbon atoms; each R is selected from the group consisting of hydrogen, alkyl, cycloalkyl, and aryl radicals and composites thereof, the total of said R groups in each NC$_2$R$_4$ group containing up to 20 carbon atoms; Z is a polymer of a monomer selected from the group consisting of aliphatic conjugated dienes containing from 4 to 12 carbon atoms per molecule, vinyl-substituted aromatic compounds containing from 8 to 20 carbon atoms per molecule, vinyl substituted pyridine, quinoline and isoquinoline compounds containing from 7 to 19 carbon atoms per molecule, acrylic and alkacrylic acid esters, acrylonitriles, N,N-disubstituted acrylamides, vinylfurans, N-vinylcarbazole and mixtures thereof.

2. A method of making a terminally reactive polymer which comprises polymerizing a polymerizable vinylidene-containing monomer selected from the group consisting of aliphatic conjugated dienes containing from 4 to 12 carbon atoms per molecule, vinyl substituted aromatic compounds containing from 8 to 20 carbon atoms per molecule, vinyl substituted pyridine, quinoline and isoquinoline compounds containing from 7 to 19 carbon atoms per molecule, acrylic and alkacrylic acid esters, acrylonitriles, N,N-disubstituted acrylamides, vinylfuran and N-vinylcarbazole in the presence of an organoalkali metal initiator and reacting the resulting polymer containing terminal alkali metal atoms with a polyaziridinyl compound in which each aziridinyl group has the formula

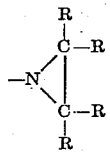

wherein each R is selected from the group consisting of hydrogen, alkyl, cycloalkyl, and aryl radicals, and composites thereof, the total of said R groups containing up to 20 carbon atoms, and is attached to an atom selected from the group consisting of sulfur, carbon and phosphrous, said sulfur being doubly bonded to oxygen and said carbon and phosphorus being doubly bonded to an atom selected from the group consisting of oxygen, sulfur, and nitrogen, said compound being free of other functional groups more reactive than said aziridinyl groups which would terminate said polymer containing terminal alkali metal atoms by replacing said alkali metal atoms with hydrogen and said compound containing up to 16 carbon atoms in addition to the carbon atoms in said aziridinyl groups.

3. A method of making a terminally reactive polymer which comprises polymerizing an aliphatic conjugated diene having 4 to 12 carbon atoms per molecule in the presence of an organolithium initiator and reacting the resulting polymer containing terminal lithium atoms with from 1 to 40 gram mols per gram atom of lithium in the polymer of a polyaziridinyl compound in which each aziridinyl group has the formula

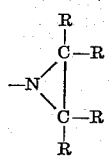

wherein each R is selected from the group consisting of hydrogen, alkyl, cycloalkyl, and aryl radicals, and composites thereof, the total of said R groups containing up to 20 carbon atoms, and is attached to an atom selected from the group consisting of sulfur, carbon and phosphorus, said sulfur being doubly bonded to oxygen and said carbon and phosphorus being doubly bonded to an atom selected from the group consisting of oxygen, sulfur and nitrogen, said compound being free of other functional groups more reactive than said aziridinyl groups which would terminate said polymer containing terminal alkali metal atoms by replacing said alkali metal atoms with hydrogen and said compounds containing up to 16 carbon atoms in addition to the carbon atoms in said aziridinyl group.

4. The method of claim 3 wherein said polyaziridinyl compound is tri(2-methyl-1-aziridinyl)phosphine oxide.

5. The method of claim 3 wherein said polyaziridinyl compound is tri(2,2 - dimethyl - 1 - aziridinyl)phosphine oxide.

6. The method of claim 3 wherein said polyaziridinyl compound is phenyl-di(2-methyl-1-aziridinyl)phosphine oxide.

7. The method of claim 3 wherein said polyaziridinyl compound is tri(2-methyl-1-aziridinyl)phosphine sulfide.

8. The method of claim 3 wherein said polymer containing terminal lithium atoms is reacted with a mixture of tri(2-methyl-1-aziridinyl)phosphine oxide and phenyl-di(2-methyl-1-aziridinyl)phosphine oxide.

9. A method of making a terminally reactive polymer which comprises polymerizing 1,3-butadiene in the presence of an organo dilithium initiator, contacting the resulting polymer containing terminal lithium atoms with tri(2-methyl-1-aziridinyl)phosphine oxide, replacing the lithium atoms in the resulting polymer with hydrogen atoms, and recovering the polymer.

10. A method of making a cured polymeric product which comprises reacting a polymer of a vinylidene-containing compound selected from the group consisting of aliphatic conjugated dienes having from 4 to 12 carbon atoms per molecule, vinyl substituted aromatic compounds containing from 8 to 20 carbon atoms per molecule, vinyl substituted pyridine, quinoline and isoquinoline compounds containing from 7 to 19 carbon atoms per molecule, acrylic and alkacrylic acid esters, acrylonitriles, N, N-di-substituted acrylamides, vinylfural and N-vinylcarbazole having at least about one terminally positioned aziridinyl group per molecule, said aziridinyl group having the formula

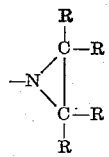

wherein R is selected from the group consisting of hydrogen, alkyl, cycloalkyl, and aryl radicals, and composites thereof, the total of said R groups containing up to 20 carbon atoms with a polyfunctional organic compound selected from the group consisting of polybasic acids and anhydrides thereof, said polyfunctional organic compound containing from 2 to 12 carbon atoms.

11. A polymeric product prepared by the method of claim 10.

12. A method of making a cured polymeric product which comprises reacting a polymer of an aliphatic conjugated diene having 4 to 12 carbon atoms per molecule, said polymer containing at least about one terminally positioned aziridinyl group per molecule, said aziridinyl group having the formula

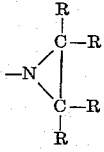

wherein each R is selected from the group consisting of hydrogen, alkyl, cycloalkyl, and aryl radicals, and composites thereof, the total of said R groups containing up to 20 carbon atoms, with a material selected from the group consisting of mercapto-substituted carboxy acids and mercapto-substituted carboxy acid anhydrides, said mercapto-substituted carboxy acids and said mercapto-substituted carboxy acid anhydrides containing from 2 to 10 carbon atoms per molecule.

13. A polymeric product prepared by the method of claim 12.

14. A method of making a cured polymeric product which comprises polymerizing an aliphatic conjugated diene have 4 to 12 carbon atoms per molecule in the presence of an organo dilithium initiator, reacting the resulting polymer with a polyaziridinyl compound in which each aziridinyl group has the formula

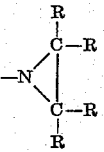

wherein each R is selected from the group consisting of hydrogen, alkyl, cycloalkyl, and aryl radicals and composites thereof, the total of said R groups containing up to 20 carbon atoms, and is attached to an atom selected from the group consisting of sulfur, carbon and phosphorus, said sulfur being doubly bonded to oxygen and said carbon and phosphorus being doubly bonded to an atom selected from the group consisting of oxygen, sulfur and nitrogen, said compound being free of other functional groups more reactive than said aziridinyl groups which would terminate said polymer containing terminal alkali metal atoms by replacing said alkali metal atoms with hydrogen and said compound containing up to 16 carbon atoms in addition to the carbon atoms in said aziridinyl groups, replacing the lithium atoms in the resulting polymer with hydrogen atoms, and curing the polymer so prepared containing terminal aziridinyl groups with a curing agent having at least about 2 carboxy groups per molecule selected from the group consisting of polybasic acids containing up to 10 carbon atoms per molecule, carboxy telechelic polymers, and polymerized fatty acids.

15. The method of claim 14 wherein said conjugated diene is 1,3-butadiene, said polyazirdinyl compound is tri(2-methyl-1-aziridinyl)phosphine oxide, said organic compound containing carboxy groups is a liquid carboxy telechelic polybutadiene.

16. A polymer having the formula

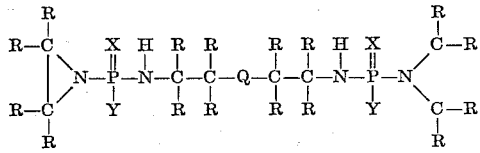

wherein Q is a polymer of butadiene, each X is selected from the group consisting of sulfur and oxygen atoms, each Y is selected from the group consisting of

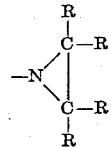

and phenyl, and each R is selected from the group consisting of hydrogen and methyl.

References Cited by the Examiner
UNITED STATES PATENTS

| | | | |
|---|---|---|---|
| 2,460,581 | 2/1949 | Jansen | 260—239 |
| 2,915,480 | 12/1959 | Reeves et al. | 260—239 |
| 3,055,952 | 9/1962 | Goldberg | 260—635 |
| 3,074,917 | 1/1963 | Reynolds | 260—85.1 |
| 3,097,193 | 7/1963 | Grover | 260—85.1 |
| 3,135,716 | 6/1964 | Uraneck et al. | 260—94.7 |

JOSEPH L. SCHOFER, *Primary Examiner.*

M. LIBERMAN, LEON J. BERCOVITZ, *Examiners.*